July 21, 1925.
T. W. BRYANT
ROLLER SKATE WHEEL
Filed March 3, 1923
1,546,775
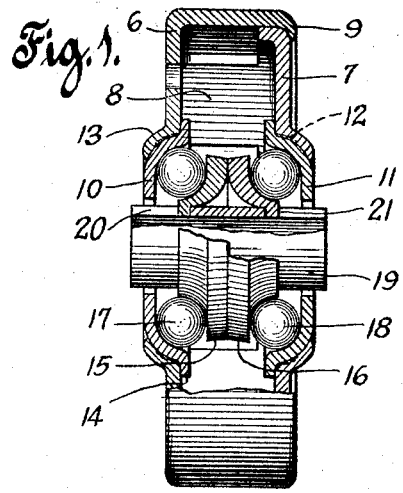
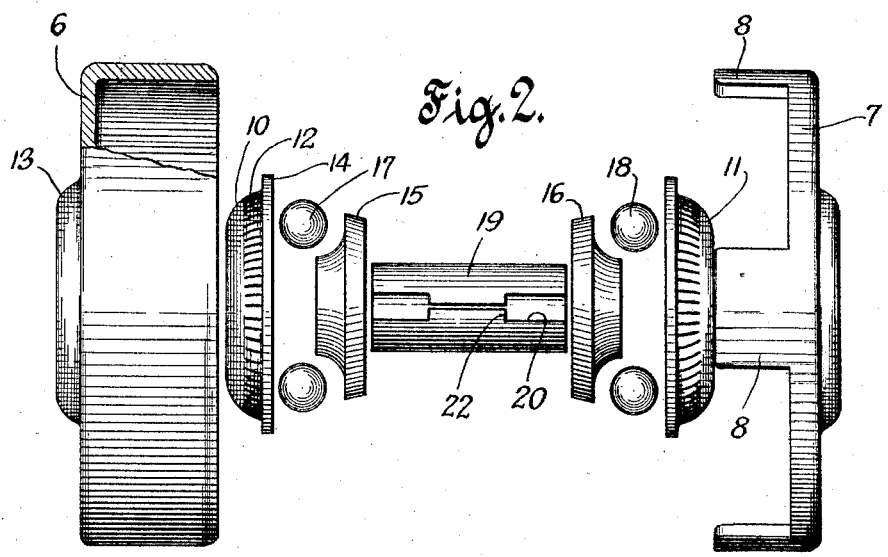
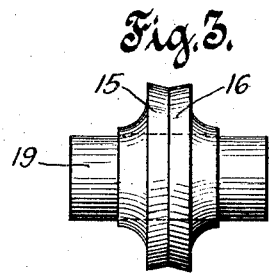
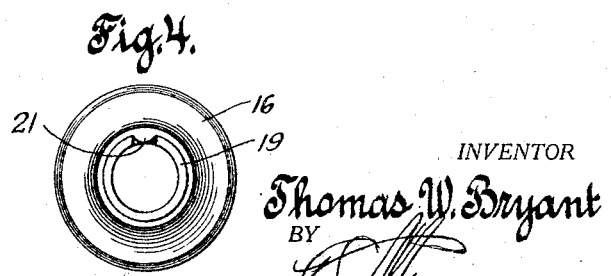
INVENTOR
Thomas W. Bryant
BY
ATTORNEY Patented July 21, 1925.

1,546,775

UNITED STATES PATENT OFFICE.

THOMAS W. BRYANT, OF TORRINGTON, CONNECTICUT.

ROLLER-SKATE WHEEL.

Application filed March 3, 1923. Serial No. 622,705.

*To all whom it may concern:*

Be it known that I, THOMAS W. BRYANT, a citizen of the United States of America, residing at Torrington, Connecticut, have invented a new and useful Roller-Skate Wheel, of which the following is a specification.

The main object of my invention is to provide an easy running durable construction which can be made cheaply.

In carrying out the invention in its preferred form the parts are so constructed and arranged that with the exception of the balls they can all be made of sheet metal and readily assembled.

Fig. 1 is an edge view and partial section of a construction embodying the improvements of my invention.

Fig. 2 shows the separate parts of the wheel of Fig. 1.

Fig. 3 is a side view of the inner bearing member.

Fig. 4 is an end view of the same.

The casing or body of the wheel consists of the two parts 6 and 7 so constructed as to be readily assembled one within the other and to reinforce each other. The outer member 6 has one wall adapted to serve as a tread and the other member has a portion 8 preferably in the form of lugs which fit inside the outer member and abut against the web of the outer member. The outer member is rolled or flanged backwardly at 9 around the edge of the member 7 to permanently secure the parts together.

The two parts 6 and 7 are provided with outer ball races which in the form shown are preferably cups 10 and 11 secured inside of the members 6 and 7. For this purpose each cup may be scored or provided with teeth 12 adapted to be forced into a boss 13 so as to hold the parts securely together without the necessity of riveting or welding. Each cup is preferably provided with a flange 14 which serves as a limiting stop in the assembly of the parts.

The inner bearing member is in the form of two cup-like or flanged washers 15 and 16 which abut against each other and are provided with ball races facing outwardly to coact with the two series of balls 17 and 18. These washers 15 and 16 are preferably mounted on a tubular support 19 which extends slightly beyond the opposite faces of the casing. To prevent rotation of the bearing washers 15 and 16 on the support 19 I may provide a slot 20 in the support and each washer may have a lug 21 which extends into this slot as shown in Figs. 1 and 4. By providing the tube 19 with shoulders 22 adjacent the lugs 21 the tube may be prevented from shifting laterally with respect to the bearing washers. The tube may be conveniently formed of sheet metal rolled into shape.

It should be noted that the ball bearing surfaces are so constructed and arranged as to afford both axial and radial support. By having the flanges of the washers 15 and 16 abut against each other and also supporting their outwardly flaring inner edges on the member 19 adequate strength can be provided with a minimum thickness of metal. It is possible therefore to stamp the bearing washers 15 and 16 out of sheet metal. When the split tubular form is used this may also be formed of sheet metal cut and rolled into shape. The outer bearing cups may also be suitably formed from sheet metal and as they are reinforced by the bosses of the casing they may be made of a minimum thickness of metal. The casing being formed of interlocking parts may also be made of comparatively thin metal.

I claim:

1. A roller skate wheel comprising a tubular support, two separately formed flanged bearing washers mounted thereon with their flanges in mutual supporting engagement and having outwardly facing ball races, a set of balls in each ball race and a casing having ball cups facing toward said bearing washers and holding said balls and washers in place.

2. A roller skate wheel comprising a casing having outwardly extending bosses, flanged bearing cups having teeth seated in said bosses and having inwardly facing ball races, a central support, bearing washers mounted on the middle of said support and having outwardly facing ball races and a set of balls arranged between each bearing cup and the adjacent bearing washer.

3. A wheel comprising a two part casing having interfitting flanges reinforcing each other, inwardly facing cup ball races secured in the ends thereof respectively, a tubular support, cupped washers supported thereon and braced against each other and a set of balls in each ball race engaging said washers so as to resist axial as well as radial thrust.

4. A wheel comprising a slotted tubular support, two flanged bearing washers mounted thereon with their flanges in mutual supporting engagement and having outwardly facing ball races and lugs interlocked with said support to prevent longitudinal movement thereon, a set of balls in each ball race and a casing having separately formed hardened ball cups facing toward said bearing washers and holding said balls, washers and support in place.

5. A wheel comprising a two part casing having interfitting flanges reinforcing each other, flanged and inwardly facing outer cup ball races held in said casing, a support, inner cupped washers supported thereon between said outer cup ball races and braced against each other and having lugs extending into said support, and a set of balls between each ball race and the adjacent washer.

6. A skate wheel comprising a tubular shaft, two oppositely disposed bearing discs mounted on the outer ends of said shaft and arranged back to back and coacting to support each other and having outwardly facing concave bearing faces, bearing balls travelling on said faces, bearing cups supported on said balls and two body parts having interfitting flange members one of which serves as a tread and the other of which reinforces said tread, said body parts having flanges supported on said bearing cups.

THOMAS W. BRYANT.